United States Patent [19]
Bull et al.

[11] Patent Number: 6,096,439
[45] Date of Patent: Aug. 1, 2000

[54] SURFACE TREATMENT OF PLASTICS FILMS

[75] Inventors: Stephen John Bull; Adrian Michael Jones, both of Didcot; Andrew Robert McCabe, Oxford, all of United Kingdom

[73] Assignee: AEA Technology PLC, Didcot, United Kingdom

[21] Appl. No.: 08/456,254

[22] Filed: May 31, 1995

[30] Foreign Application Priority Data

Jun. 24, 1994 [GB] United Kingdom .................... 9412793

[51] Int. Cl.⁷ .......................... B32B 27/16; B32B 27/32; B32B 27/36
[52] U.S. Cl. ........................ 428/480; 428/35.7; 428/523; 428/910; 427/523; 427/525; 206/524.1; 206/819; 426/106
[58] Field of Search ................................. 428/34.1, 35.7, 428/480, 523, 910; 427/523, 525, 530, 533, 535, 536, 551, 553; 156/446, 488; 426/106; 206/524.1, 819

[56] References Cited

U.S. PATENT DOCUMENTS

| | | | |
|---|---|---|---|
| 4,199,650 | 4/1980 | Mirtich | 428/421 |
| 4,452,827 | 6/1984 | Kolev | 427/38 |
| 4,526,832 | 7/1985 | Bernett et al. | 428/336 |
| 4,743,493 | 5/1988 | Sioshansi et al. | 428/217 |
| 5,130,161 | 7/1992 | Mansur et al. | 427/38 |
| 5,133,757 | 7/1992 | Sioshansi et al. | 623/18 |
| 5,223,309 | 6/1993 | Farivar et al. | 427/525 |
| 5,308,704 | 5/1994 | Suzuki | 428/410 |
| 5,332,625 | 7/1994 | Dunn et al. | 428/409 |
| 5,389,195 | 2/1995 | Ouderkirk et al. | 156/643 |
| 5,407,992 | 4/1995 | Lee et al. | 427/523 |

FOREIGN PATENT DOCUMENTS

| | | |
|---|---|---|
| 0206145 | 12/1986 | European Pat. Off. . |
| 2071673 | 9/1981 | United Kingdom . |

OTHER PUBLICATIONS

Ulf W. Gedde et al, "Ion Irradiation of Polypropylene," Journal of Applied Polymer Science, vol. 39 (1990), pp. 477–482.

Lynn B. Bridwell et al, "Ion Implantation of Polymers for Electrical Conductivity Enhancement," Nuclear Instruments and Methods in Physics Research, B56/57 (1991) pp. 656, 658.

Kenji Umezawa et al, "Study of Diffusion of a Fluorinated Hydrocarbon in Ion Beam Irradiated Poly(styrene) by Nuclear Resonance Reaction Analysis," Appl. Phys. Lett., vol. 61, No. 13, 1992, pp. 1603–1604.

Schmitz, Peter et al., "Films." Ullman's Encyclopedia of Industrial Chemistry, 5th Ed., vol. A11, pp. 85–86, 109, 1988.

Jenekhe, Samson A., "Ion Implantation." Encyclopedia of Polymer Science and Engineering, supplemental volume, pp. 352–361, 1989.

*Primary Examiner*—Vivian Chen
*Attorney, Agent, or Firm*—William H. Holt

[57] ABSTRACT

An improved polymer film material for the packaging of perishable foodstuffs, wherein the surface structure of the polymer is altered by means of an ion bombardment process so as to reduce the rates of transport of oxygen and water vapor through the polymer material wherein the polymer film material is produced by subjecting at least one surface of the film to ion bombardment with ions selected from the group consisting of hydrogen, carbon, nitrogen, helium, and argon at energies of 30–80 KeV and ion doses in the range of $10^{12}$ to $10^{18}$ ions/cm².

17 Claims, 1 Drawing Sheet

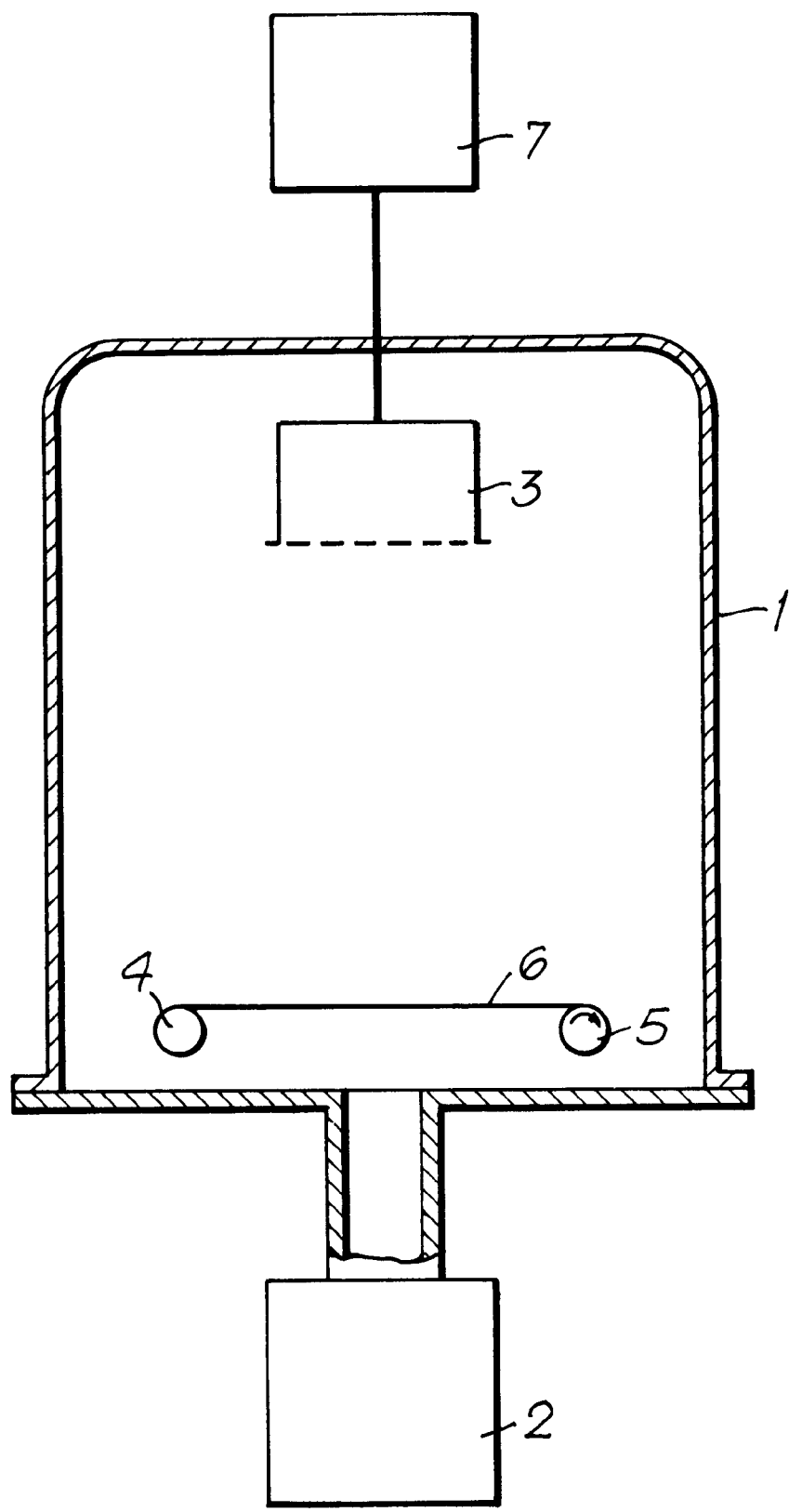

SURFACE TREATMENT OF PLASTICS FILMS

The present invention relates to the treatment of the surface of films made of polymer materials and more particularly to such films for use in the packaging of goods. The treatment may be to reduce the permeability of polymer films, to improve their printability, or both. The invention is concerned, particularly with polymer films used for the packaging of foods and beverages.

BACKGROUND OF INVENTION

The two most widely-used polymer films for food and beverage packaging are polyethylene terephthalate and biaxially-oriented polypropylene. One of the major factors affecting the shelf life of food packaged in containers including films made of the above two materials is their permeability to oxygen and water vapour.

At present, the barrier properties of these materials are improved by vacuum coating them with aluminium to a thickness of a few tens of nanometers and an optical density of about 2.5. Metallization of one side of the film only reduces the oxygen permeation by a factor of about 100 and water vapour permeation by a factor of about 500. Metallization of both sides of the film improves these figures by a further factor of 5.

However, the use of aluminium as a coating material has several disadvantages; one is the possible link between the presence of aluminium particulates in food and Alzheimer's disease; another is that the contents of a package are invisible to a would-be purchaser, a third is that the presence of the aluminium coating means that food which requires cooking cannot be cooked in the package by microwave radiation, and a fourth is that such coated materials cannot be recycled.

Other methods which have been suggested for reducing the permeability of polymer films include laminating together two different polymer films, for example, polyvinylidene chloride and polyethylene terephthalate; depositing a film of silica on the polymer film by the thermal evaporation of silica; or the deposition of other oxides of silicon by various vapour deposition techniques. The purpose of the use of silicon oxides other than silica is to attempt to provide barrier layers which do not suffer from the brittleness of silica.

It is known that the rate of diffusion of fluorinated hydrocarbons through glassy polystyrene can be reduced by bombarding the polystyrene with $H^+$ ions at an energy of 30 KeV and ion doses between $10^{13}$ and $10^{15}$ ions/cm$^2$ (see Study of Diffusion of a Fluorinated Hydrocarbon in Ion Beam Irradiated Polystyrene by Nuclear Magnetic Resonance Reaction Analysis. Uwezawa et al Appl. Phys. Lett., Vol. 61(13), Sep. 28, 1992 pp 1603–4). The work was carried out in connection with the development of polymer encapsulants for microelectronic devices.

Another problem associated with polymers as packaging materials is that it is difficult to print upon them. The problem is exacerbated by the transition, for environmental reasons to water-based rather than hydrocarbon solvent-based inks.

SUMMARY OF INVENTION

It is an object of the present invention to provide an improved polymer film for the packaging of perishable materials, particularly foodstuffs.

According to the present invention in one aspect there is provided a method of modifying the surface structure of a film of polymer material for use as a packaging material for perishable materials to reduce the transport of gaseous material therethrough, comprising the operation of subjecting the film of polymer material to bombardment with ions selected from the group consisting of hydrogen, carbon, nitrogen, helium and argon at energies in the range 1 to 80 KeV and ion doses in the range $10^{12}$ to $10^{18}$ ions/cm$^2$.

According to the invention in a second aspect, there is provided a polymer film for use as a packaging material for perishable foodstuffs, wherein at least one surface of the polymer film material has been modified by being subjected to bombardment with ions for reducing the transport of gaseous material therethrough, the ions being selected from the group consisting of hydrogen, carbon, nitrogen, helium and argon at energies within the range of 1 to 80 KeV and ion doses in the range $10^{12}$ to $10^{18}$ ions/cm$^2$.

Suitable polymer materials for use in performing the invention are polyethylene terephthalate or biaxially-oriented polypropylene.

BRIEF DESCRIPTION OF DRAWING

The invention will now be described, by way of example with reference to the accompanying drawing which is a schematic representation of an apparatus for carrying out the invention.

DETAILED DESCRIPTION

Referring to the drawing, an apparatus for carrying out the invention comprises a vacuum chamber 1, and an associated pumping system 2. Within the vacuum chamber 1 are an ion source 3 of the gas discharge type known as a bucket source, although other types of ion source such as a twin-anode ion source can be used, a feed spool 4 and a take-up spool 5 for a film 6 of polymer material to be treated according to the invention. There is provided also a power source 7 to energise the ion source 3.

In a first example of the invention, samples of polyethylene terephthalate and biaxially-oriented polypropylene were implanted with nitrogen ions at an energy of 50 KeV and ion doses between $10^{13}$ and $10^{17}$ ions/cm$^2$. Subsequently the oxygen permeability, water vapour transmission rate and optical density were measured using techniques which are well-known in the film packaging art and are not described herein. The same parameters were measured for untreated samples of the same materials and also for samples of the same materials one surface of which has been metallised.

The results are summarised in the following table.

TABLE I

| Substrate | Ion Dose (Fluence) ions/cm$^2$ | Optical Density | WVTR gm/m$^2$/24 hrs @ 30° C. 90% RH | O$_2$ permeability cc/m$^2$/24 hrs @ 23° C., 50% RH |
|---|---|---|---|---|
| Poly- ethylene tere- phthalate | Untreated | 0.04 | 40.0 | 120.0 |
| | Metallised | 3.00 | 0.04 | 0.5 |
| | $1 \times 10^{13}$ | 0.06 | >30.0 | 140.0 |
| | $1 \times 10^{14}$ | 0.24 | >30.0 | 18.0 |
| | $1 \times 10^{15}$ | 0.19 | >30.0 | 2.0 |
| | $1 \times 10^{16}$ | 0.40 | 0.76 | 0.17 |
| | $1 \times 10^{17}$ | 0.55 | 0.83 | 0.54 |

TABLE I-continued

| Substrate | Ion Dose (Fluence) ions/cm² | Optical Density | WVTR gm/m²/24 hrs @ 30° C. 90% RH | O₂ permeability cc/m²/24 hrs @ 23° C., 50% RH |
|---|---|---|---|---|
| Bi-axially oriented polypropylene | Untreated | 0.04 | 7.0 | 3000.0 |
| | Metallised | 2.0 | 0.5 | 200.0 |
| | $1 \times 10^{13}$ | | Not measured (sample damaged) | |
| | $1 \times 10^{15}$ | 0.16 | 5.8 | 36.0 |
| | $1 \times 10^{15}$ | 0.15 | 6.1 | 29.0 |
| | $1 \times 10^{15}$ | 0.13 | 6.3 | 30.0 |
| | $1 \times 10^{16}$ | 0.40 | 0.53 | 73.0 |

It can be seen that, for polyethylene terephthalate, ion doses above $1 \times 10^{14}$ ions/cm² all gave superior performance in relation to both oxygen permeability and water vapour transmission rate, when compared with untreated material, albeit with an increase in the optical density.

An ion dose of $1 \times 10^{16}$ ions/cm² gave particularly good results.

So far as biaxially oriented polypropylene is concerned, the results are more variable, but they show a marked decrease in the oxygen permeability, particularly for an ion dose of $1 \times 10^{16}$ ions/cm², as before.

However, insofar as the oxygen permeability is concerned, it appears that at higher ion doses a correlation between the ion dose and the oxygen permeability may occur.

In a second example of the invention, samples of polyethylene terephthalate only were subjected to ion bombardment with ions of hydrogen, nitrogen, and argon at various energies and ion doses.

In a first treatment the material was treated with nitrogen ions at energies ranging from 20 KeV to 70 KeV and a fixed ion dose of $10^{16}$ ions/cm².

In a second treatment the material was treated with nitrogen ions at a constant energy of 30 KeV but ion doses ranging from $10^{15}$ to $10^{17}$ ions/cm².

In a third treatment the material was treated with hydrogen ions at energies ranging from 30 KeV to 70 KeV and ion doses ranging from $10^{15}$ to $10^{17}$ ions/cm², and in a fourth treatment the material was treated with argon ions at energies ranging from 30 KeV to 70 KeV and ion doses of $3 \times 10^{15}$ and $10^{16}$ ions/cm².

Again, the results are expressed in the form of a table:

TABLE II

| Exp No. | Ion | Energy (KeV) | Ion Dose (Ions/cm²) | Optical Density | O₂ Transmission rate cc/m²/day | Moisture vapour transmission rate g/m²/day |
|---|---|---|---|---|---|---|
| 1(a) | N⁺ | 20 | $1 \times 10^{16}$ | 0.21 | 2.49 | 8.84 |
| 1(b) | N⁺ | 30 | $1 \times 10^{16}$ | 0.34 | 1.56 | 1.67 |
| 1(c) | N⁺ | 40 | $1 \times 10^{16}$ | 0.43 | 1.71 | 2.01 |
| 1(d) | N⁺ | 50 | $1 \times 10^{16}$ | 0.53 | 0.86 | 1.16 |
| 1(e) | N⁺ | 60 | $1 \times 10^{16}$ | 0.59 | 0.45 | 1.55 |
| 1(f) | N⁺ | 70 | $1 \times 10^{16}$ | 0.67 | 0.29 | 0.38 |
| 2(a) | N⁺ | 30 | $1 \times 10^{15}$ | 0.23 | 2.94 | 12.63 |
| 2(b) | N⁺ | 30 | $3 \times 10^{15}$ | 0.30 | 0.52 | 1.27 |
| 2(c) | N⁺ | 30 | $5 \times 10^{15}$ | 0.35 | 0.73 | 1.51 |
| 2(d) | N⁺ | 30 | $1 \times 10^{16}$ | 0.39 | 1.62 | 1.88 |
| 2(e) | N⁺ | 30 | $3 \times 10^{16}$ | 0.46 | 3.2 | 1.72 |
| 2(f) | N⁺ | 30 | $5 \times 10^{16}$ | 0.49 | 1.95 | 1.97 |
| 2(g) | N⁺ | 30 | $1 \times 10^{17}$ | 0.52 | 1.38 | 1.03 |
| 3(a) | H⁺ | 30 | $1 \times 10^{16}$ | 0.34 | 0.96 | 1.80 |
| 3(b) | H⁺ | 50 | $1 \times 10^{16}$ | 0.47 | 1.09 | 0.73 |
| 3(c) | H⁺ | 70 | $1 \times 10^{16}$ | 0.53 | 0.70 | 2.10 |
| 3(d) | H⁺ | 30 | $3 \times 10^{15}$ | 0.27 | 0.72 | 1.91 |
| 3(e) | H⁺ | 30 | $3 \times 10^{16}$ | 0.41 | 1.37 | 2.60 |
| 3(f) | H⁺ | 30 | $1 \times 10^{17}$ | 0.57 | 0.49 | 1.76 |
| 4(a) | Ar⁺ | 30 | $1 \times 10^{16}$ | 0.34 | 2.87 | 2.20 |
| 4(b) | Ar⁺ | 50 | $1 \times 10^{16}$ | 0.50 | 1.02 | 1.86 |
| 4(c) | Ar⁺ | 70 | $1 \times 10^{16}$ | 0.61 | 0.44 | 0.80 |
| 4(d) | Ar⁺ | 50 | $3 \times 10^{15}$ | 0.35 | 0.72 | 2.27 |

The above values are to be compared with those for untreated polyethylene terephthalate, which for 12 μm thick material are:

a) O₂ transmission rate @23° C. and 50% Relative Humidity; 120 cc/m²/24 hours.

b) Moisture vapour transmission rate @30° C., 90% RH, 40 grams/m²/24 hours.

Metallised polyethylene terephthalate has oxygen and moisture vapour transmission rates of 0.30 cc/m²/day at 23° C. and 50% RH, and 0.5 gms/m²/day at 30° C. and 90% RH respectively.

It can be seen that at least some of the treatment shown in Table II, for example, treatments 1(d), 1(f), (b), 2(c), 3(c), 3(d), 3(f), 4(c) and 4(d) give values approaching these.

Those treatments (1(f) and 4(c)) which gave the best reductions in oxygen and water vapour transport also produced the highest optical densities.

It is believed that the improvements in the barrier properties of the above, and other packaging materials are results of cross-linking between polymer chains in the materials and densification of the surface. Other effects include microroughening of the surface, the destruction of waxy surface deposits which often occur on the surfaces of polymer materials and the introduction of new chemical species, particularly oxygen, into the surface of the packaging material. This may occur as a result of the ion implantation treatment or on subsequent exposure to the atmosphere. The above effects improve the ink-retaining properties of polymer materials, particularly for inks which use polar solvents, such as water-based inks.

Thus in addition to improving the barrier properties of polymer packaging materials, the present invention also improves their printability.

We claim:

1. A method of modifying the surface structure of a film of polymer material for use as a packaging material for perishable materials to reduce the transport of gaseous material therethrough, comprising the operation of subjecting the film of polymer material to bombardment with ions selected from the group consisting of hydrogen, nitrogen, helium and argon at energies in the range 30 to 80 KeV and ion doses in the range $10^{12}$ to $10^{18}$ ions/cm².

2. A method according to claim 1 wherein the polymer film packaging material is subjected to bombardment with ions of nitrogen having energies in the range 30 KeV to 70 KeV and ion doses of between $10^{13}$ and $10^{18}$ ions/cm² are implanted.

3. A method according to claim 1 wherein the ions have an energy of about 50 KeV and an ion dose of the order of $10^{16}$ ions/cm² is implanted.

4. A method according to claim 1 wherein the ions have an energy of about 70 KeV and an ion dose of the order of $10^{16}$ ions/cm² is implanted.

5. A method according to claim 1 wherein the polymer film packaging material is subjected to bombardment with ions of hydrogen having energies in the range 30 KeV to 70 KeV and the ion doses in the range of $10^{15}$ to $10^{17}$ ions/cm$^2$.

6. A method according to claim 5 wherein the ions have an energy of about 30 KeV and an ion dose of the order of $10^{17}$ ions/cm$^2$ is implanted.

7. A method according to claim 1 wherein the polymer film packaging material is subjected to bombardment with ions of argon having energies in the range 30 KeV to 70 KeV and the ion dose is in the range $10^{15}$ to $10^{16}$ ions/cm$^2$.

8. A method according to claim 7 wherein the ions have an energy of 70 KeV and the ion dose is of the order of $10^{16}$ ions/cm$^2$.

9. A method according to claim 1 wherein the polymer film packaging material is polyethylene terephthalate or biaxially oriented polypropylene.

10. A perishable foodstuff package comprising a polymer film material made by the method claimed in claim 1 encompassing, at least in part, a perishable foodstuff.

11. In a method of packaging perishable foodstuff comprising encompassing, at least partially, a perishable foodstuff with a polymer film as a packaging material, the improvement comprising providing as the packaging material a polymer film the surface structure of which has been modified to reduce the transport of gaseous material therethrough as claimed in claim 1.

12. A polymer film for use as a packaging material for perishable foodstuffs, wherein at least one surface of the polymer film material has been subjected to bombardment with ions for reducing the transport of gaseous material therethrough, said ions being selected from the group consisting of hydrogen, nitrogen, helium and argon at energies within the range of 30 to 80 KeV and ion doses in the range of $10^{12}$ to $10^{18}$ ions/cm$^2$.

13. A polymer film packaging material according to claim 12 wherein the polymer is polyethylene teraphthalate or biaxially oriented polypropylene.

14. A perishable foodstuff package comprising a polymer film material as claimed in claim 12 encompassing, at least partially, a perishable foodstuff.

15. In a method of packaging perishable foodstuff comprising encompassing, at least partially, perishable foodstuff with a polymer film as a packaging material, the improvement comprising using as the packaging material a polymer film as claimed in claim 12.

16. A method of modifying the surface structure of a film of polymer material for use as a packaging material for perishable food-stuff materials to reduce the transport of gaseous materials therethrough, comprising the operation of subjecting the film of polymer material to bombardment with carbon ions at energies in the range of 30 to 80 KeV for enhancing gas barrier properties of said polymer against the passage of oxygen and water vapor therethrough.

17. A method as defined in claim 16 wherein the polymer material is dosed with said carbon ions on the order of $10^{12}$ to $10^{18}$ ions/cm$^2$.

\* \* \* \* \*